(12) United States Patent
Shaga et al.

(10) Patent No.: US 10,921,155 B2
(45) Date of Patent: Feb. 16, 2021

(54) MULTI CYCLE DUAL REDUNDANT ANGULAR POSITION SENSING MECHANISM AND ASSOCIATED METHOD OF USE FOR PRECISE ANGULAR DISPLACEMENT MEASUREMENT

(71) Applicant: Microsemi Corporation, Chandler, AZ (US)

(72) Inventors: Ganesh Shaga, Warangal (IN); Bala Sundaram Nauduri, Hyderabad (IN)

(73) Assignee: Microsemi Corporation, Chandler, AZ (US)

( * ) Notice: Subject to any disclaimer, the term of this patent is extended or adjusted under 35 U.S.C. 154(b) by 110 days.

(21) Appl. No.: 16/205,103

(22) Filed: Nov. 29, 2018

(65) Prior Publication Data
US 2019/0242725 A1    Aug. 8, 2019

(30) Foreign Application Priority Data
Feb. 2, 2018 (IN) ............................. 201821004008

(51) Int. Cl.
   *G01D 5/20*   (2006.01)
   *G01D 3/08*   (2006.01)
(52) U.S. Cl.
   CPC ............. *G01D 5/202* (2013.01); *G01D 3/08* (2013.01); *G01D 5/204* (2013.01)
(58) Field of Classification Search
   CPC .......... G01D 5/202; G01D 5/204; G01D 3/08; H02H 3/05
   See application file for complete search history.

(56) References Cited

U.S. PATENT DOCUMENTS

| 4,847,548 A | 7/1989 | Lafler |
| 4,853,604 A | 8/1989 | McMullin et al. |

(Continued)

FOREIGN PATENT DOCUMENTS

| DE | 10120822 A1 | 4/2002 |
| EP | 0467514 A2 | 1/1992 |

(Continued)

OTHER PUBLICATIONS

"A Revolution in Sensing: World's First Inductance-to-Digital Converter", Texas Instruments, 2013, pp. 1-6.

(Continued)

*Primary Examiner* — Patrick Assouad
*Assistant Examiner* — Demetrius R Pretlow
(74) *Attorney, Agent, or Firm* — Glass and Associates; Kenneth Glass

(57) ABSTRACT

An apparatus can include a first planar inductive sensor including two oscillator coils and two sensing coils. The apparatus can also include a second planar inductive sensor independent of the first sensor and also including a pair of oscillator and sensing coils. The apparatus can further include a high frequency alternating current carrier generator configured to inject high frequency alternating current carrier signals into the oscillator coils. The carrier signal for the oscillator coil of the first planar inductive sensor is 180 degrees out of phase with a $2^{nd}$ oscillator coil of the same planar inductive sensor, and wound in an opposite geometric direction, and the oscillator coils of the other inductive sensor can also be wound similarly The two sensing coils of the first planar inductive sensor can be 90 degrees out of phase with each another, and the sensing coils of the other inductive sensor can also be wound similarly.

13 Claims, 15 Drawing Sheets

(56) References Cited

U.S. PATENT DOCUMENTS

| | | | |
|---|---|---|---|
| 5,061,896 A | 10/1991 | Schmidt | |
| 5,239,288 A | 8/1993 | Tsals | |
| 6,236,199 B1 | 5/2001 | Irle et al. | |
| 6,239,571 B1 | 5/2001 | Shimahara | |
| 6,255,810 B1 | 7/2001 | Irle et al. | |
| 6,304,014 B1 | 10/2001 | England et al. | |
| 6,304,076 B1 | 10/2001 | Madni et al. | |
| 6,384,598 B1 | 5/2002 | Hobein et al. | |
| 6,522,128 B1 | 2/2003 | Ely et al. | |
| 6,593,730 B2 | 7/2003 | Zapf | |
| 6,605,940 B1 | 8/2003 | Tabrizi et al. | |
| 7,276,897 B2 | 10/2007 | Lee | |
| 7,726,208 B2 | 6/2010 | Hoeller et al. | |
| 7,821,256 B2 | 10/2010 | Lee | |
| 7,906,960 B2 | 3/2011 | Lee | |
| 8,508,242 B2 | 8/2013 | Shao et al. | |
| 8,618,791 B2 * | 12/2013 | Grinberg | G01B 7/023 324/207.15 |
| 8,947,077 B2 | 2/2015 | Lee et al. | |
| 8,988,066 B2 | 3/2015 | Shao et al. | |
| 9,528,858 B2 * | 12/2016 | Bertin | G01D 5/2086 |
| 9,677,913 B2 | 6/2017 | Wang et al. | |
| 10,415,952 B2 | 9/2019 | Reddy | |
| 2002/0000129 A1 | 1/2002 | Madni et al. | |
| 2002/0097042 A1 | 7/2002 | Kawate et al. | |
| 2003/0206007 A1 | 11/2003 | Gass et al. | |
| 2004/0080313 A1 | 4/2004 | Brosh | |
| 2004/0081313 A1 | 4/2004 | Mcknight et al. | |
| 2007/0001666 A1 | 1/2007 | Lee | |
| 2008/0164869 A1 | 7/2008 | Bach et al. | |
| 2008/0174302 A1 | 7/2008 | Lee et al. | |
| 2008/0238416 A1 | 10/2008 | Shiraga et al. | |
| 2009/0079422 A1 | 3/2009 | Lee | |
| 2010/0271012 A1 * | 10/2010 | Patterson | G01D 5/204 324/207.15 |
| 2011/0101968 A1 * | 5/2011 | Brands | G01D 5/2073 324/207.17 |
| 2012/0081106 A1 * | 4/2012 | Grinberg | G01B 7/023 324/207.15 |
| 2012/0175198 A1 * | 7/2012 | Thibault | H02K 7/06 188/71.5 |
| 2012/0242352 A1 * | 9/2012 | Gong | H03K 17/9525 324/656 |
| 2013/0289826 A1 | 10/2013 | Yoshitake et al. | |
| 2016/0214648 A1 | 7/2016 | Schoepe et al. | |
| 2017/0158231 A1 | 6/2017 | Farrelly | |
| 2017/0166251 A1 | 6/2017 | Shao et al. | |
| 2019/0063956 A1 * | 2/2019 | Bertin | G01D 5/208 |
| 2019/0226828 A1 * | 7/2019 | Lugani | G01B 7/003 |
| 2019/0242725 A1 | 8/2019 | Shaga et al. | |
| 2019/0331541 A1 | 10/2019 | Janisch et al. | |

FOREIGN PATENT DOCUMENTS

| | | |
|---|---|---|
| EP | 1914520 A2 | 4/2008 |
| EP | 2145158 A2 | 1/2010 |
| EP | 2044389 B1 | 4/2010 |
| FR | 2304900 A1 | 10/1976 |
| JP | 3839449 B2 | 8/2006 |
| WO | 2008125853 A1 | 10/2008 |
| WO | 2017100515 A1 | 6/2017 |
| WO | 2018108783 A2 | 6/2018 |
| WO | 2019152092 A1 | 8/2019 |

OTHER PUBLICATIONS

International Search Report and Written Opinion, PCT/US2018/063681, dated Mar. 8, 2019.

U.S. Appl. No. 16/152,802, filed Oct. 2018, Kevin Mark Smith, Jr.

PCT/US2019/042895, International Search Report, dated Oct. 21, 2019.

PCT/US2019/042895, Written Opinion of the International Search Authority, dated Oct. 21, 2019.

\* cited by examiner

MULTI CYCLE DUAL REDUNDANT ANGULAR POSITION SENSING MECHANISM AND ASSOCIATED METHOD OF USE FOR PRECISE ANGULAR DISPLACEMENT MEASUREMENT

BACKGROUND

Field

Various position sensing application may benefit from dual redundant sensing. For example, a multi-cycle dual redundant angular position sensing mechanism and associated method of use, may be useful for precise angular displacement measurement in safety-critical applications, where failure in sensing system will not result in catastrophe, as it is backed up by a similar system with the same form-factor and accommodated in same space.

Description of the Related Art

Position sensors are a common element in automotive, industrial, and aerospace industries. More generally, highly robust and reliable position sensors are valuable whenever safety is a concern. Most of the safety requirements can be met using electrically redundant position sensor arrangements, which can be achieved by using two independent position sensors to measure the same parameter.

Potentiometers are used as redundant position sensors. They are contact type sensors and lead to wear and noise. To overcome these drawbacks, non-contact type sensors are used. These sensors are based on inductive, capacitive, optical, and Hall Effect principles. Optical encoders provide good resolution but lead to higher cost and reliability related issues in the harsh/contaminated environment. The Hall sensors are sensitive to temperature and external magnetic fields. Capacitive sensors are very sensitive to extreme environmental changes. Implementing redundancy design with Hall, optical, and capacitive technologies can increase the component count and cost.

Additionally, conventional inductive position sensors are expensive. They are both expensive in terms of cost and in terms of space: they occupy significant three-dimensional space as they are radially wound on a core.

SUMMARY

According to certain embodiments, an apparatus can include a first planar inductive sensor including two oscillator coils which are 180 degrees out of phase with respect to each other and two sensing coils. The apparatus can also include a second planar inductive sensor independent of the first sensor including two oscillator coils which are 180 degrees out of phase with respect to each other and two sensing coils. The apparatus can further include a high frequency alternating current carrier generator configured to inject high frequency alternating current carrier signals into the oscillator coils. A carrier signal for the oscillator coils of the first planar inductive sensor can be in phase with a carrier signal for the oscillator coils of the second planar inductive sensor. The oscillator coils of the first planar inductive sensor can be wound in a same geometric direction as respective oscillator coils of the second planar inductive sensor. The two sensing coils of the first planar inductive sensor can be 90 degrees out of phase with one another. The two sensing coils of the second planar inductive sensor can be 90 degrees out of phase with one another.

In certain embodiments, a method can include providing an apparatus having a first planar inductive sensor that includes two oscillator coils and two sensing coils, and also having a second planar inductive sensor independent of the first sensor and also including two oscillator coils and two sensing coils. The method can also include providing a target electromagnetically linked to each of the sensing coils. The method can further include sensing an angular position of the target based on voltages induced in the sensing coils.

BRIEF DESCRIPTION OF THE DRAWINGS

For a proper understanding of the invention, reference should be made to the accompanying drawings, wherein.

DETAILED DESCRIPTION

Figure 1:
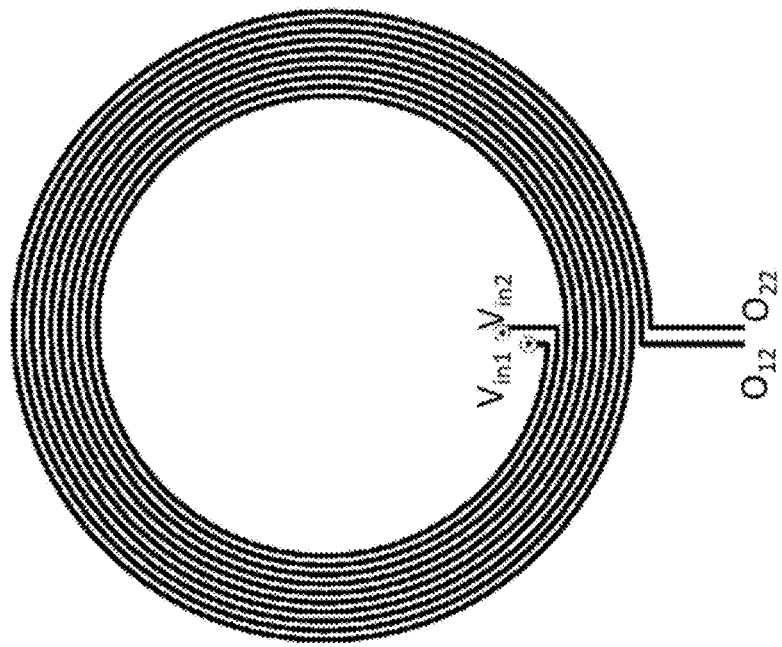
FIG. 1 illustrates two independent pairs of oscillator coils, according to certain embodiments of the present invention.
Figure 1:
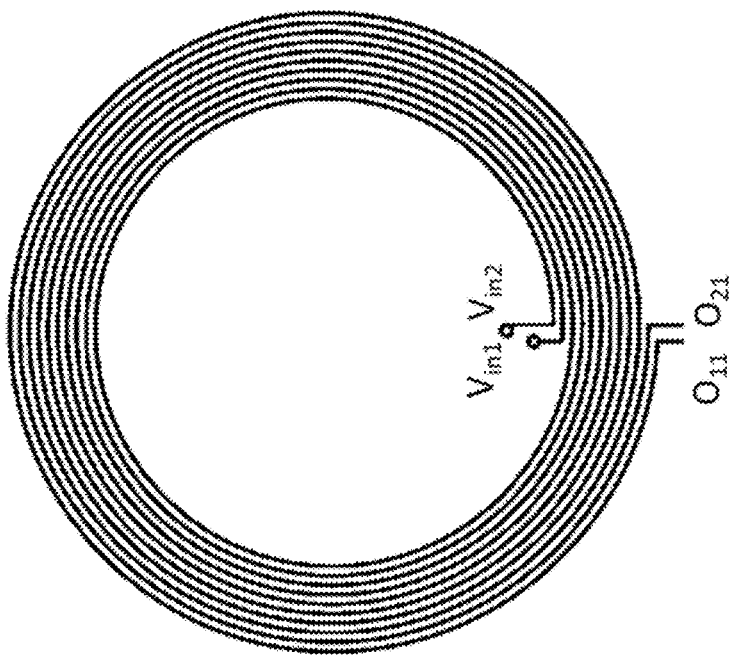

Certain embodiments of the present invention address a dual redundant position sensing mechanism using planar inductive sensing technology. Using this technology, lower angular displacements can be measured with higher accuracy than in many alternative designs. This design can be implemented using two independent sensors each having multiple cycles, without increasing the size and PCB layer count of the device as compared with a single sensing approach (non-redundant). The two independent sensors can include two isolated power supply, oscillator coils, sense coils, and ground paths. If one of these sensors malfunctions, the other can still operate and support the application. These sensors can be inexpensively constructed with stationary printed circuit boards (PCB), coils, and a metal target. A single fault in a PCB component and/or pin level will not cause both sensors to fail. Thus, this design is unique. Moreover, certain embodiments of this design can better serve safety-critical automotive applications compared to other inductive technology designs. Moreover, certain embodiments can also compete with other contemporary technologies like Hall effect, capacitive, and optical.

Certain embodiments of the present invention may have various benefits and/or advantages. For example, the design according to certain embodiments can use emerging planar inductive sensing technology, which may be robust due to the omission of moving electrical contacts, good temperature performance, and resilience to dust. These inductive sensing devices can be used as absolute position sensing devices, which means that they can determine position without moving the target at power-up.

Certain embodiments of the present invention include a sensor design that incorporates multi-cycle position detection with redundancy without affecting the cost, area, number of PCB layers, and accuracy compared to two independent traditional planar inductive sensors for redundancy. This may be the best fit solution for miniature space and price sensitive applications with high accuracy.

Because certain embodiments incorporate redundancy and a multi-cycle configuration, certain embodiments may be particularly suitable to the automotive industry, where safety critical position sensors are required. Some of the position sensing applications include, but are not limited to the brake pedal, throttle body, actuators, and motor control.

Certain embodiments of the present invention may be financially advantageous compared to be prior approaches. For example, a planar inductive position sensor according to certain embodiments may be cost-effective because coils are laid on PCB.

Moreover, single point of failure problems can be avoided by certain embodiments. For example, certain embodiments can use two independent sensor coils and integrated circuits (ICs) with the same area taken for a single sensor. If one sensor fails, the other sensor can give feedback information and serve the purpose.

Furthermore, certain embodiments can be used for low angular measurement with higher accuracy. This can be achieved by multiple cycle measurement. Moreover, these multiple cycles may also eliminate the need for precise mechanical assembly requirements.

Inductive sensors can be used to convert a linear displacement or an angular motion into a proportional electrical signal. An inductive sensor can include two primary coils that sustain the oscillation and two secondary coils that receive position information in the presence of a target.

High frequency alternating current (AC) carrier signals can be injected into oscillator coils. Oscillator coils, each with a series capacitor, form tank circuits. The respective signals for these circuits, OSC1 and OSC2 signals, can be 180° out of phase to each other. The coils for OSC1 and OSC2 can be wound in opposite directions geometrically, so the current in both the coils can flow in the same direction, ensuring addition of fields. This generated magnetic field can couple on the sensor coils. Each secondary coil can have two matched segments with current flowing in opposite directions. The two segments can have the same geometric shape. The two segments can be laid-out on the PCB in such a way that the flow of current in one segment is in the opposite direction to the other segment. When there is no target, the induced voltage in the secondary coils may be zero. When a metal target is introduced to the system with a specific air gap, eddy currents in the target can cause a difference in sense coil voltages.

Certain embodiments of the present invention provide a 60 mechanical degree design implemented in a four-layer PCB. The design can include two pairs of oscillator coils and sense coils.

FIG. 1 illustrates two independent pairs of oscillator coils, according to certain embodiments of the present invention. Specifically, the two independent pairs of oscillator coils $O_{11}$, $O_{12}$ and $O_{21}$, $O_{22}$ are shown. These oscillators can be laid based on an interlaced topology on middle layer 2 and bottom layer of a four-layer PCB. The pair of oscillator coils can be sourced from two independent power supplies, labelled $V_{in1}$ and $V_{in2}$. The signals of $O_{11}$ and $O_{12}$ can be 180° out of phase with respect to each other. $O_{21}$ and $O_{22}$ can be laid similarly but can be excited from $V_{in2}$ as shown in FIG. 1.

Figure 2A:
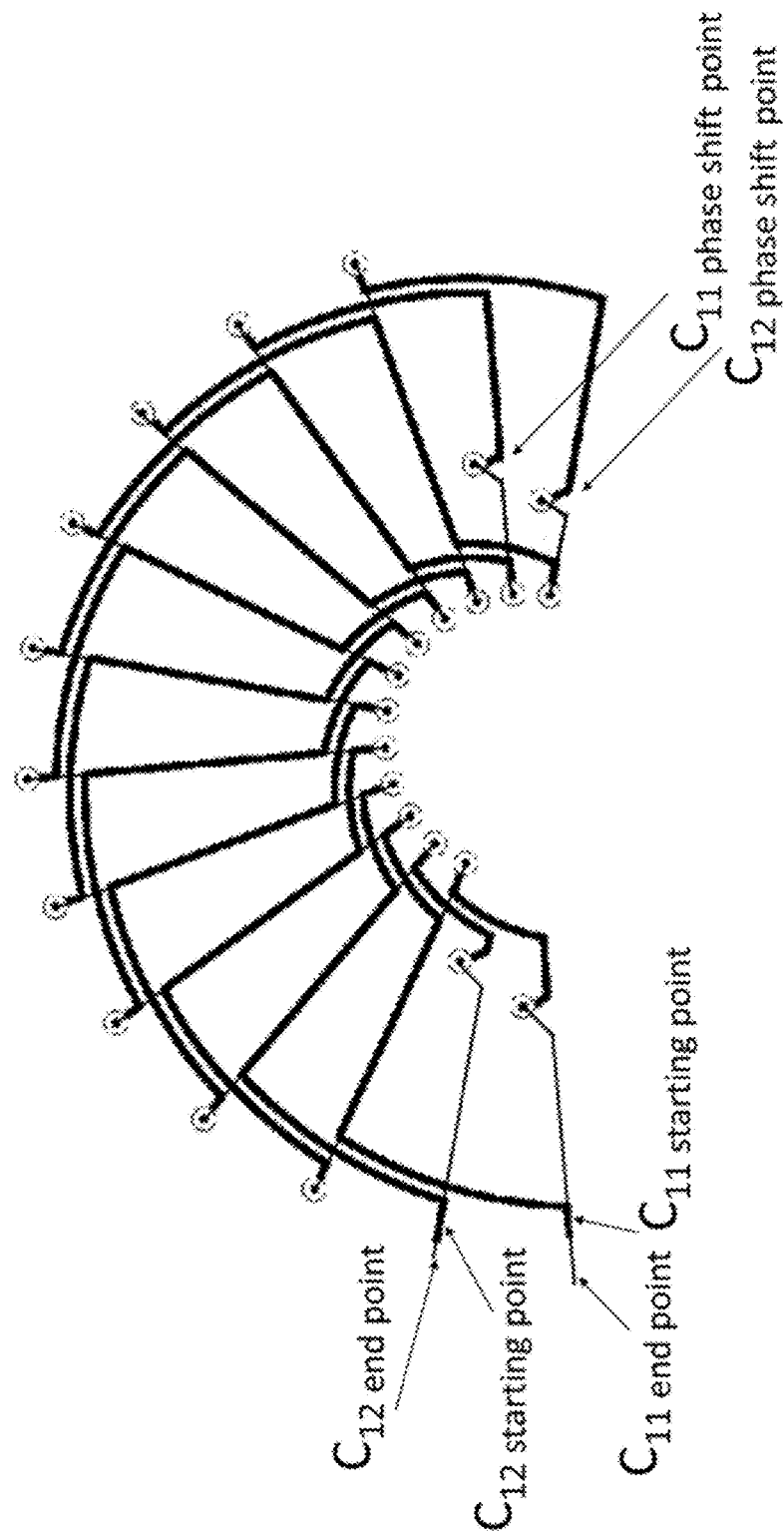
FIG. 2A shows a first pair of sense coils, according to certain embodiments of the present invention.
Figure 2B:
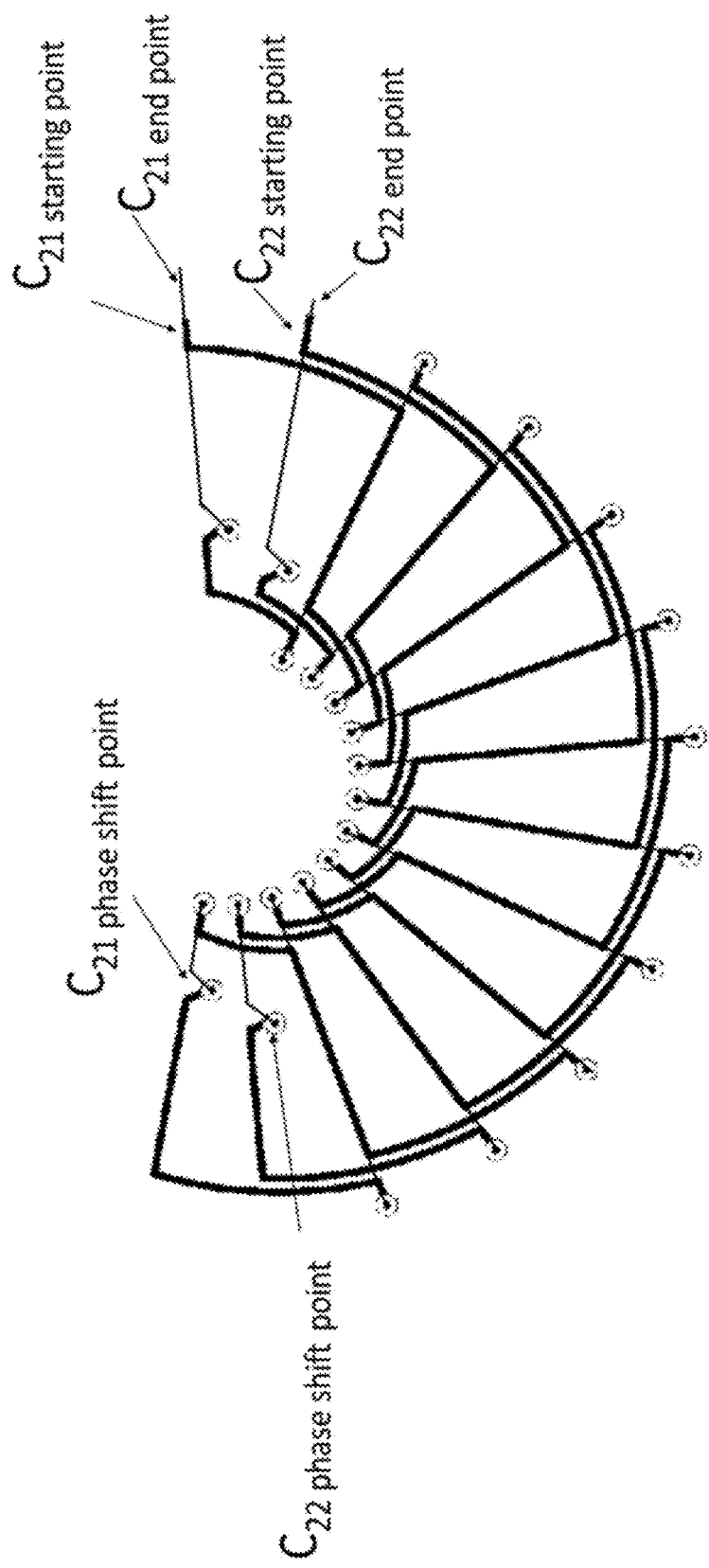
FIG. 2B shows a second pair of sense coils, according to certain embodiments of the present invention.
Figure 4A:
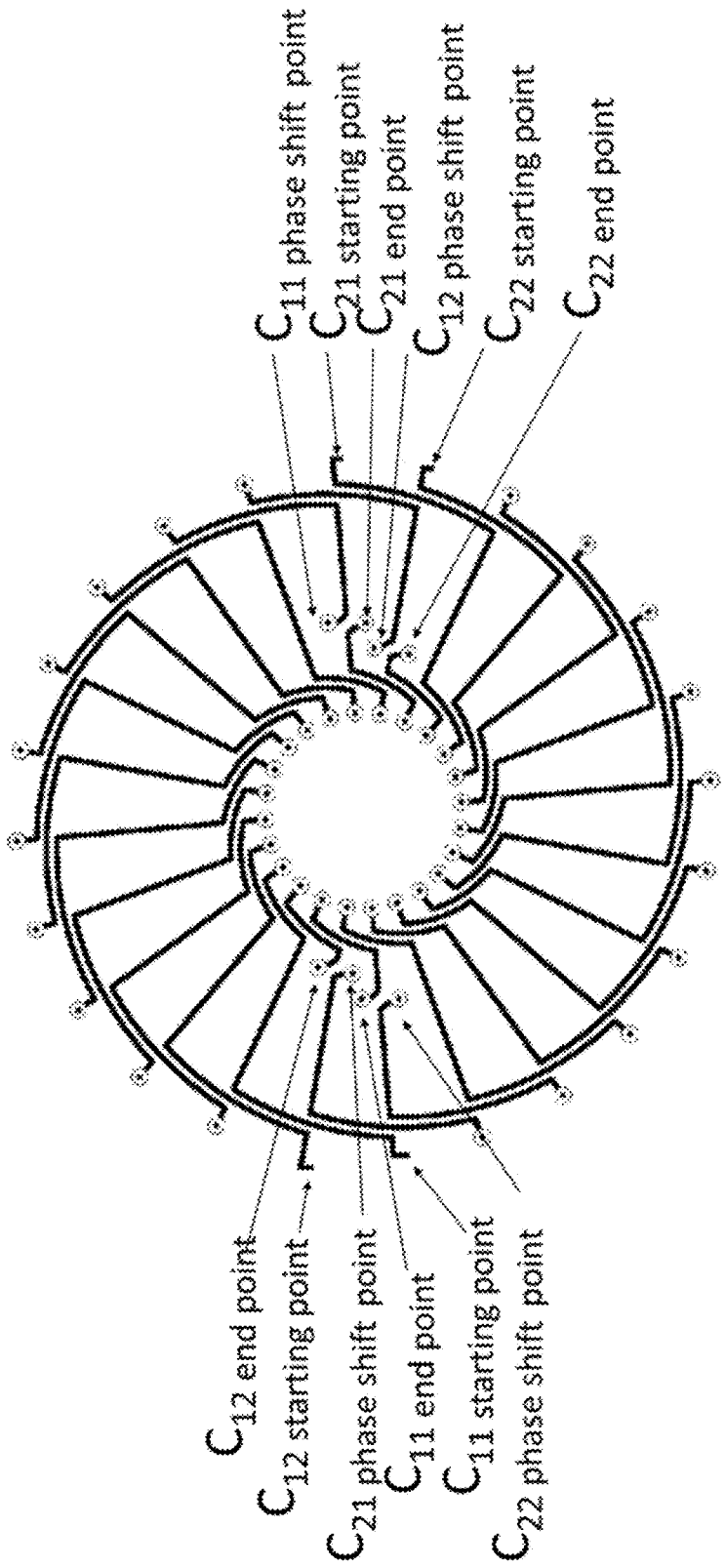
FIG. 4A illustrates a top layer of a four-layer PCB according to certain embodiments of the present invention.
Figure 4B:
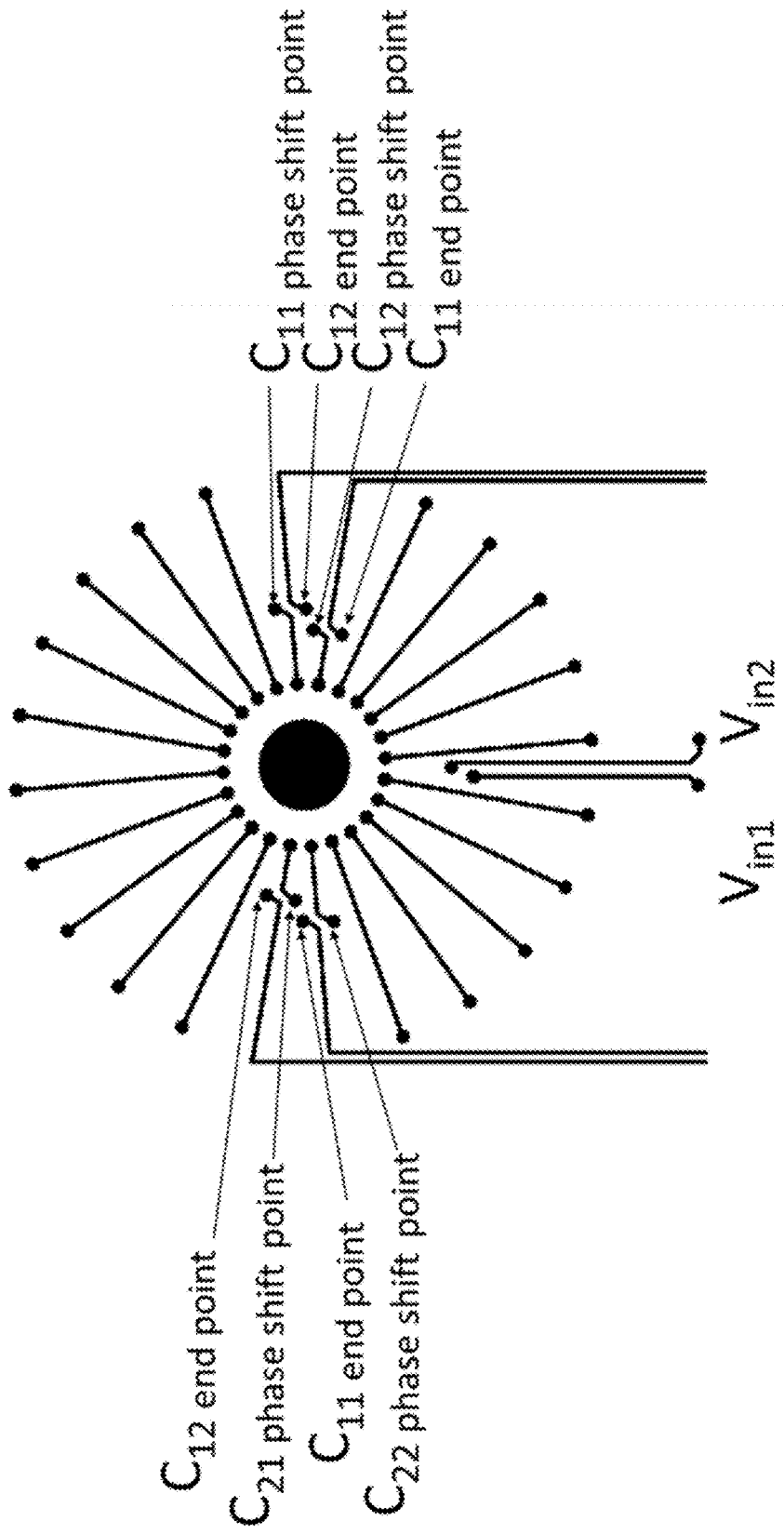
FIG. 4B illustrates a middle layer 1 of the four-layer PCB according to certain embodiments of the present invention.

In addition to the two independent pairs of oscillator coils, shown in FIG. 1, the system can also include two pairs of independent sense coils, $C_{11}$, $C_{12}$ and $C_{21}$, $C_{22}$, as shown in FIGS. 2A and 2B. The two pairs of independent sense coils can occupy respective upper and lower sides of the reference dotted line shown in FIG. 5, whereas the oscillator coils can occupy the same area corresponding to both the upper and lower sides. The sense coils can share top and middle layer 1 of the four-layer PCB as shown in FIGS. 4A and 4B respectively. FIG. 4A illustrates a top layer of a four-layer PCB according to certain embodiments of the present invention, while FIG. 4B illustrates a middle layer 1 of the four-layer PCB according to certain embodiments of the present invention.

FIG. 2A shows a first pair of sense coils, according to certain embodiments of the present invention. As shown in FIG. 2A, $C_{11}$ and $C_{12}$ sense coils can be laid at a 90° phase shift with respect to each other. This can be accomplished by laying out the coils with a predetermined mechanical offset of 15°. For example, a 360° mechanical rotation of the target plate can produce 6 electrical cycles of sine and cosine, which implies three electrical cycles for 180° rotation. The span of a single electrical cycle can spread over 60°, namely 180°/3 electrical cycles=60° for 1 electrical cycle. The target plate can accordingly be designed with six leaves for a full 360° mechanical rotation of the target and consequently with three leaves for a 180° mechanical rotation of the target (for example, three leaves may be in the upper half of the target and three leaves may be in the lower half of the target, in its initial position). Thus, the ratio of mechanical rotation to electrical rotation is one mechanical rotation for every six electrical rotations, or 1:6. To obtain an electrical separation from the mechanical separation, recall that electrically sine and cosine are 90° out of phase to each other. Because there is a 1:6 ratio between mechanical rotation and electrical rotation, a mechanical separation of 1 degree is equivalent to an electrical rotation of 6 degrees. Thus, mechanically in this system the starting points of the coils can be separated by 90°/6=15° of mechanical separation, in order to achieve 90° of electrical separation. With 90° of electrical separation, if one sense coil is driven with a sine function, then the next separated sense coil will be driven with a cosine function.

$C_{11}$ and $C_{12}$ can complete three loops on the PCB to reach $C_{11}$, $C_{12}$ phase shift points and return to the starting point in an interlaced topology through top and middle layer 1 of the four-layer PCB. $C_{11}$ and $C_{12}$ can get terminated at $C_{11}$ and $C_{12}$ end points and connected to respective ground. The phase shift points may simply be the geometric midpoints of the respective sense coils.

Figure 9:
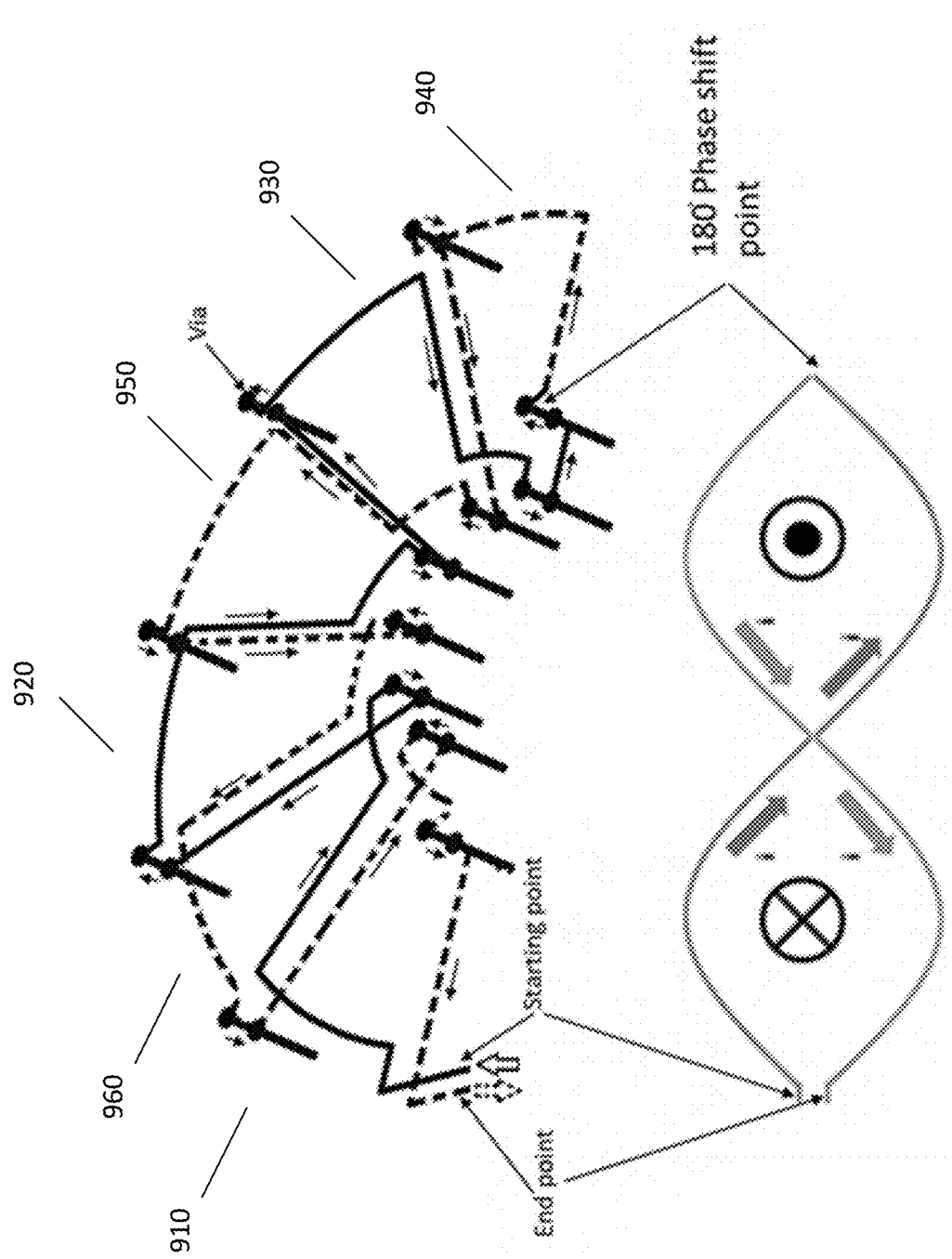
FIG. 9 illustrates a three-dimensional view of a sensing coil according to certain embodiments of the present invention.

FIG. 9 illustrates a three-dimensional view of a sensing coil according to certain embodiments of the present invention. As shown in FIG. 9, a coil can include a starting half shown in solid line and beginning at the starting point and terminating at the 180 degree phase shift point, and an ending half shown in broken line and beginning at the 180 degree phase shift point and ending at the end point. The starting half can include three loops 910, 920, and 930, while the ending half can similarly include three loops 940, 950, and 960. The starting half can provide a forward path for current, while the sending half can provide a return path for current, as illustrated in the lower portion of FIG. 9.

FIG. 2B shows a second pair of sense coils, according to certain embodiments of the present invention. As shown in FIG. 2B, $C_{21}$ and $C_{22}$ can be the other two sense coils laid at 90° phase shift with respect to each other. $C_{21}$ and $C_{22}$ can complete three cycles to reach $C_{21}$, $C_{22}$ phase shift points and can return to the starting point in an interlaced topology through top and middle layer 1 of the 4-layer PCB. $C_{21}$ and $C_{22}$ can get terminated at $C_{21}$ and $C_{22}$ end points and connected to respective ground.

Figure 3:
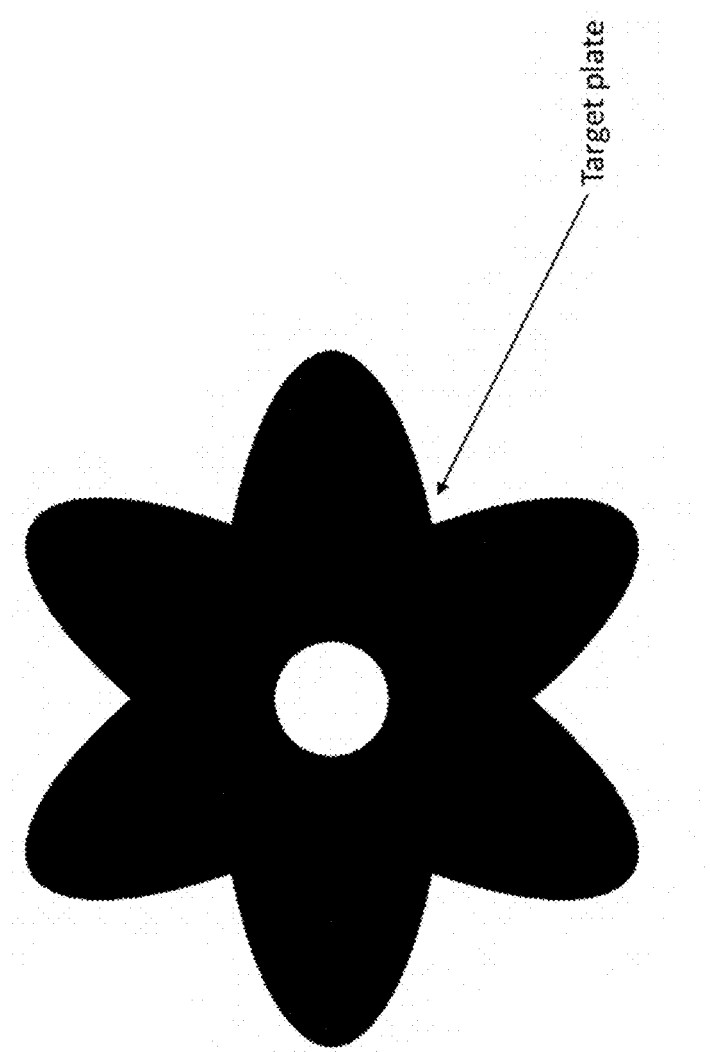
FIG. 3 illustrates a target plate according to certain embodiments of the present invention.

A high frequency signal can be introduced to $O_{11}$, $O_{12}$ and $O_{21}$, $O_{22}$ independently. When no target is present, the voltage induced in the sense coil is zero. FIG. 3 illustrates a target plate according to certain embodiments of the present invention. This six-leaved shape represents one possible embodiment. In this case, FIG. 3 is drawn to scale, although departures from that scale are permitted.

Figure 5:
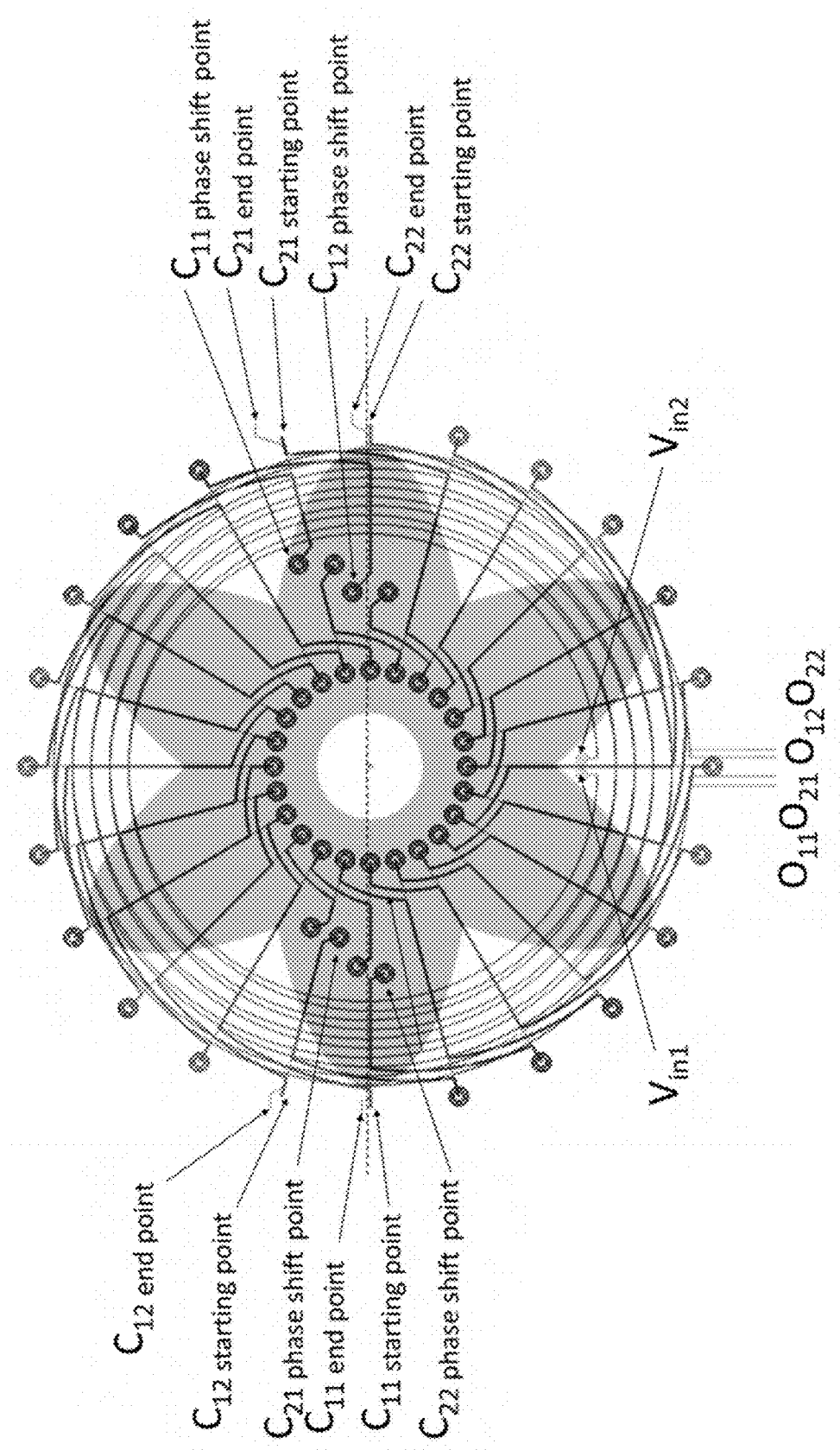
FIG. 5 provides a see-through illustration of the four-layer PCB and a target PCB according to certain embodiments of the present invention.

When a target (for example, target PCB or target plate) shown in FIG. 3 is placed on top of the sense coil with a specific air gap, a time varying magnetic field can induce voltage in sense coils of upper and lower parts of the reference dotted line shown in FIG. 5. The time varying magnetic field can be the result of an oscillating current in the oscillator coils generating eddy currents in the target. FIG. 5 provides a see-through illustration of the four-layer PCB and a target, which may be a plate or PCB, according to certain embodiments of the present invention. The voltage induced in the sense coils $C_{11}$, $C_{12}$, $C_{21}$, $C_{22}$ can be read back independently and position information can be calculated based on the independent voltages.

Figure 7A:
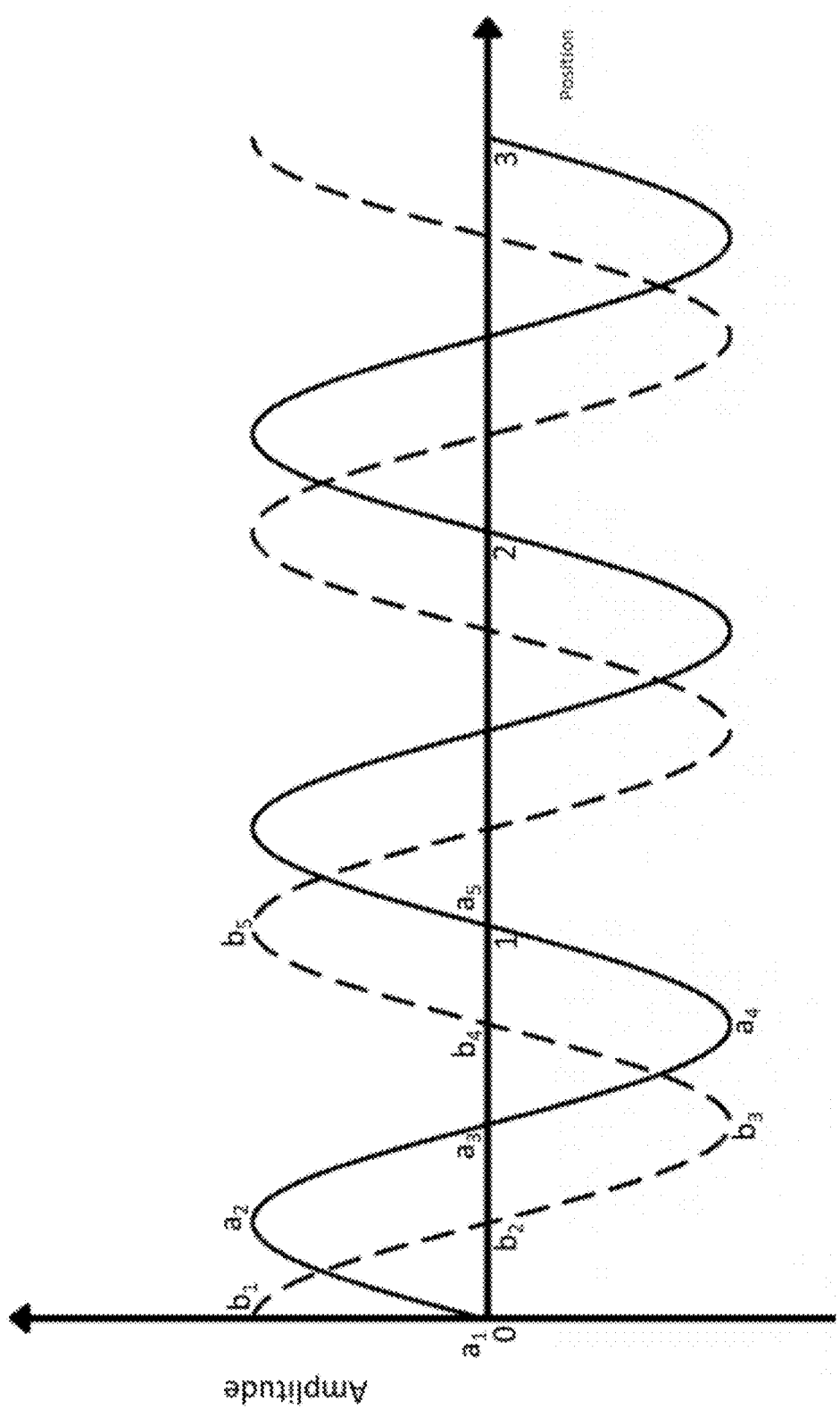
FIG. 7A illustrates the induced voltage in the first pair of sense coils according to certain embodiments of the present invention.
Figure 7B:
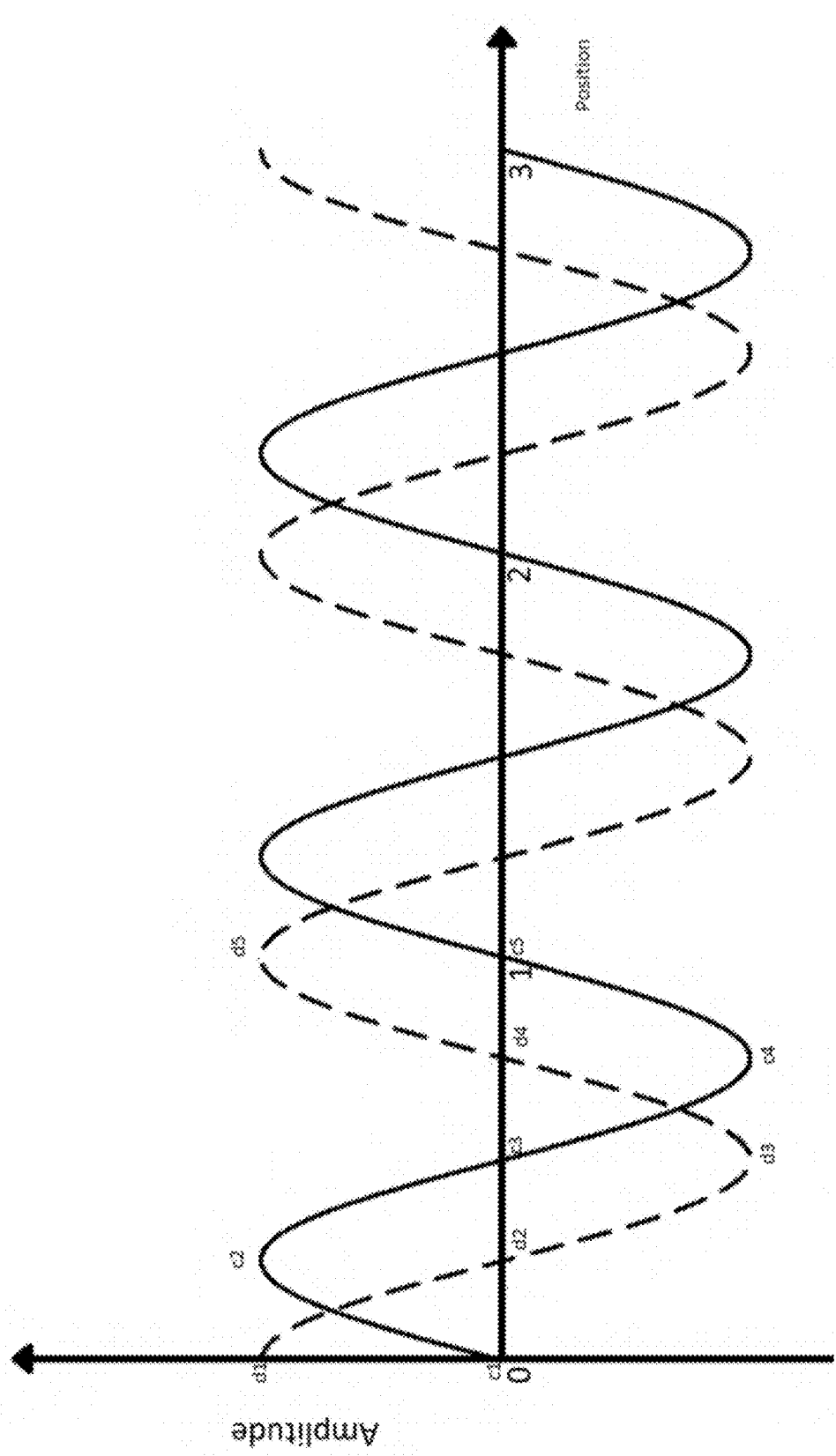
FIG. 7B illustrates the induced voltage in the second pair of sense coils according to certain embodiments of the present invention.

The target shown in FIG. 3 can assist and define the magnetic coupling between the oscillator and sense coils. The target shape can be designed in such a way that when it rotates axially, the magnetic coupling is driven in a sine function. The target can be a simple metal sheet, copper on PCB, or the like. When the target rotates, voltages induced in the sense coils $C_{11}$, $C_{12}$ and $C_{21}$, $C_{22}$ are a function of sine and cosine as shown in FIGS. 7a and 7b.

The relation between the target position and the induced sense coil voltage can be seen by relating FIGS. 6A through 6D with FIGS. 7A and 7B, as will be discussed below. FIG. 7A illustrates the induced voltage in the first pair of sense coils according to certain embodiments of the present invention, while FIG. 7B illustrates the induced voltage in a second pair of sense coils according to certain embodiments of the present invention.

Figure 6A:
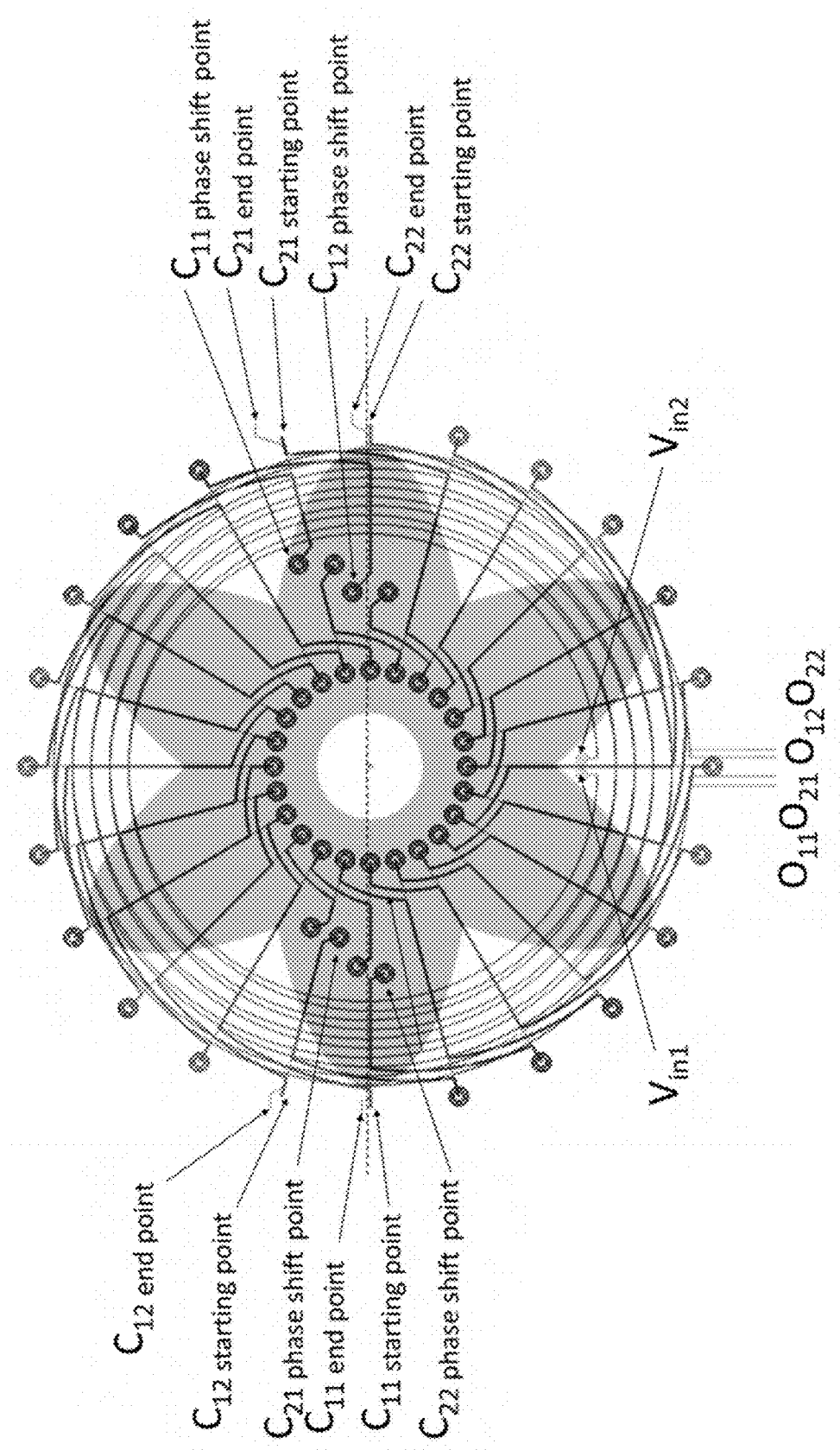
FIG. 6A illustrates a target placed at a 0 degree position, according to certain embodiments of the present invention.

FIG. 6A illustrates a target placed at a 0 degree position, according to certain embodiments of the present invention. The 0 degree position is a reference position of the target, arranged as shown in FIG. 6A. In this case, the amount of voltage induced in coil $C_{11}$, $C_{21}$ is shown respectively in FIG. 7A at point $a_1$, $b_1$. The amount of voltage induced in coil $C_{12}$, $C_{22}$ is shown in FIG. 7B at point $c_1$, $d_1$.

Figure 6B:
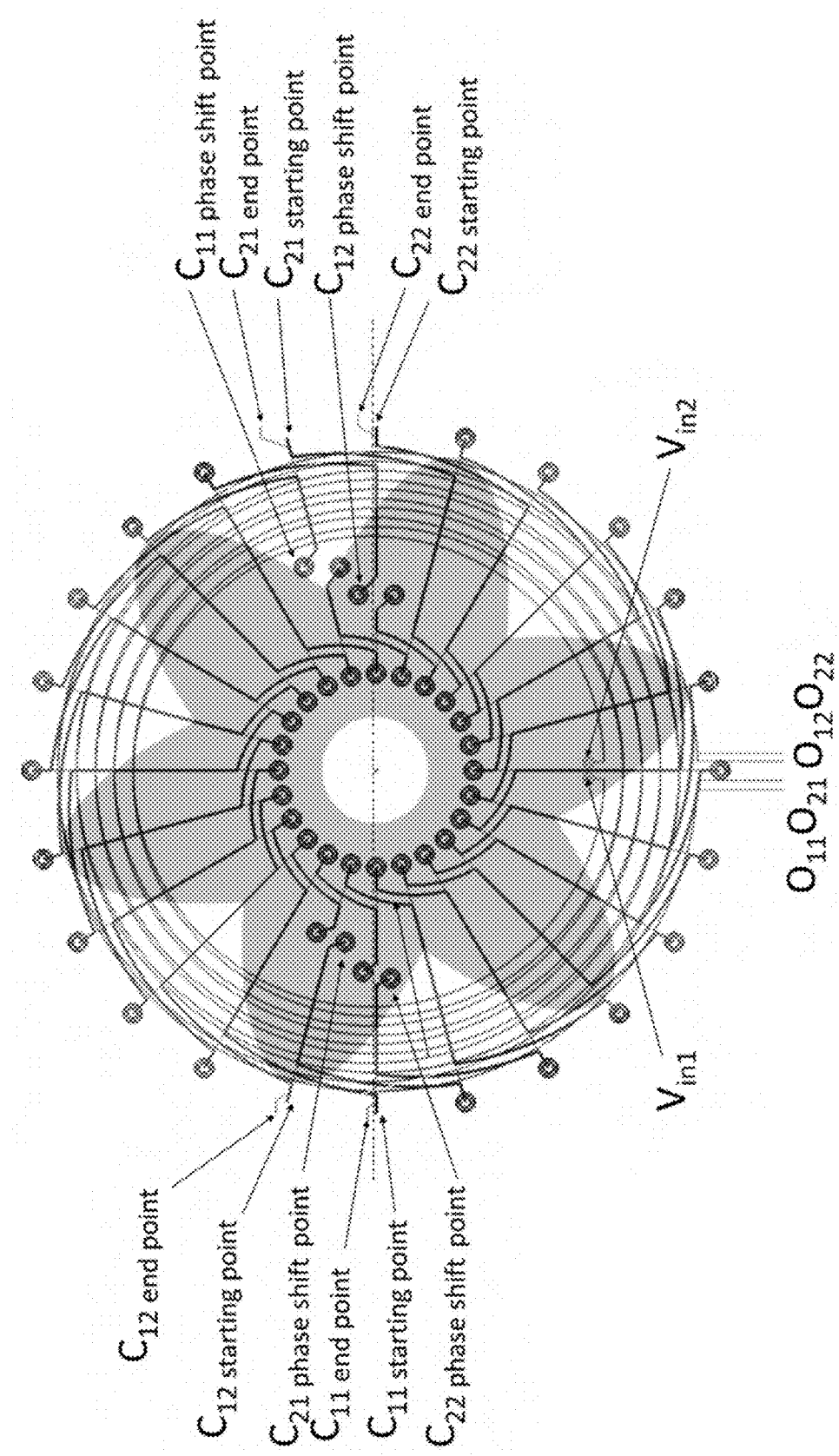
FIG. 6B illustrates a target placed at a 90 degree position, according to certain embodiments of the present invention.

FIG. 6B illustrates a target placed at a 90 degree position, according to certain embodiments of the present invention. Thus, the target is 90 degrees rotated relative to its initial position shown in FIG. 6A. In the case shown in FIG. 6B, the amount of voltage induced in coil $C_{11}$, $C_{21}$ is shown in FIG. 7A at point $a_2$, $b_2$. The amount of voltage induced in coil $C_{12}$, $C_{22}$ is shown in FIG. 7B at point $c_2$, $d_2$.

Figure 6C:
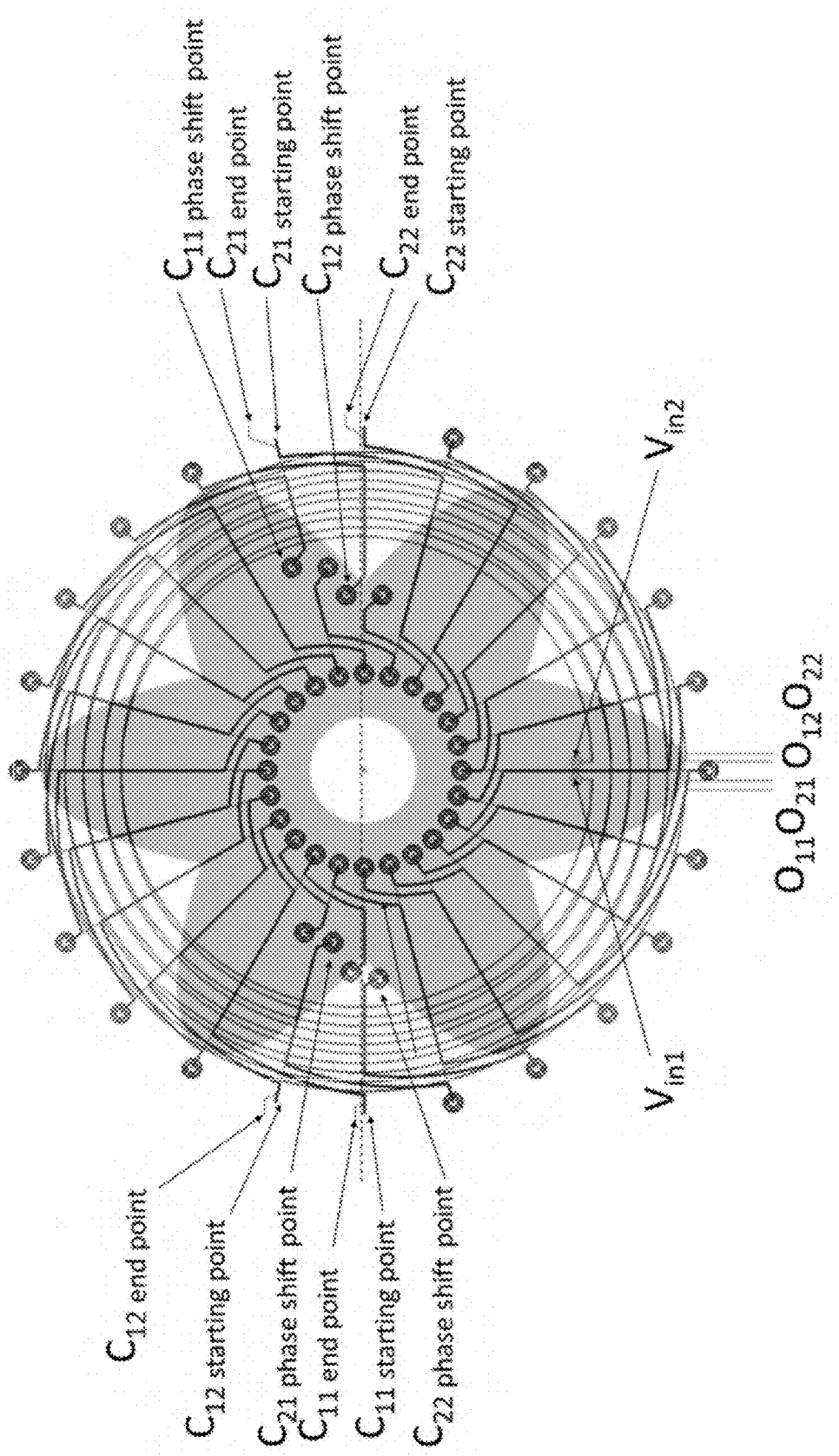
FIG. 6C illustrates a target placed at a 180 degree position, according to certain embodiments of the present invention.

FIG. 6C illustrates a target placed at a 180 degree position, according to certain embodiments of the present invention. In this case, the amount of voltage induced in coil $C_{11}$, $C_{21}$ is shown in FIG. 7A at point $a_3$, $b_3$. The amount of voltage induced in coil $C_{12}$, $C_{22}$ is shown in FIG. 7B at point $c_3$, $d_3$.

Figure 6D:
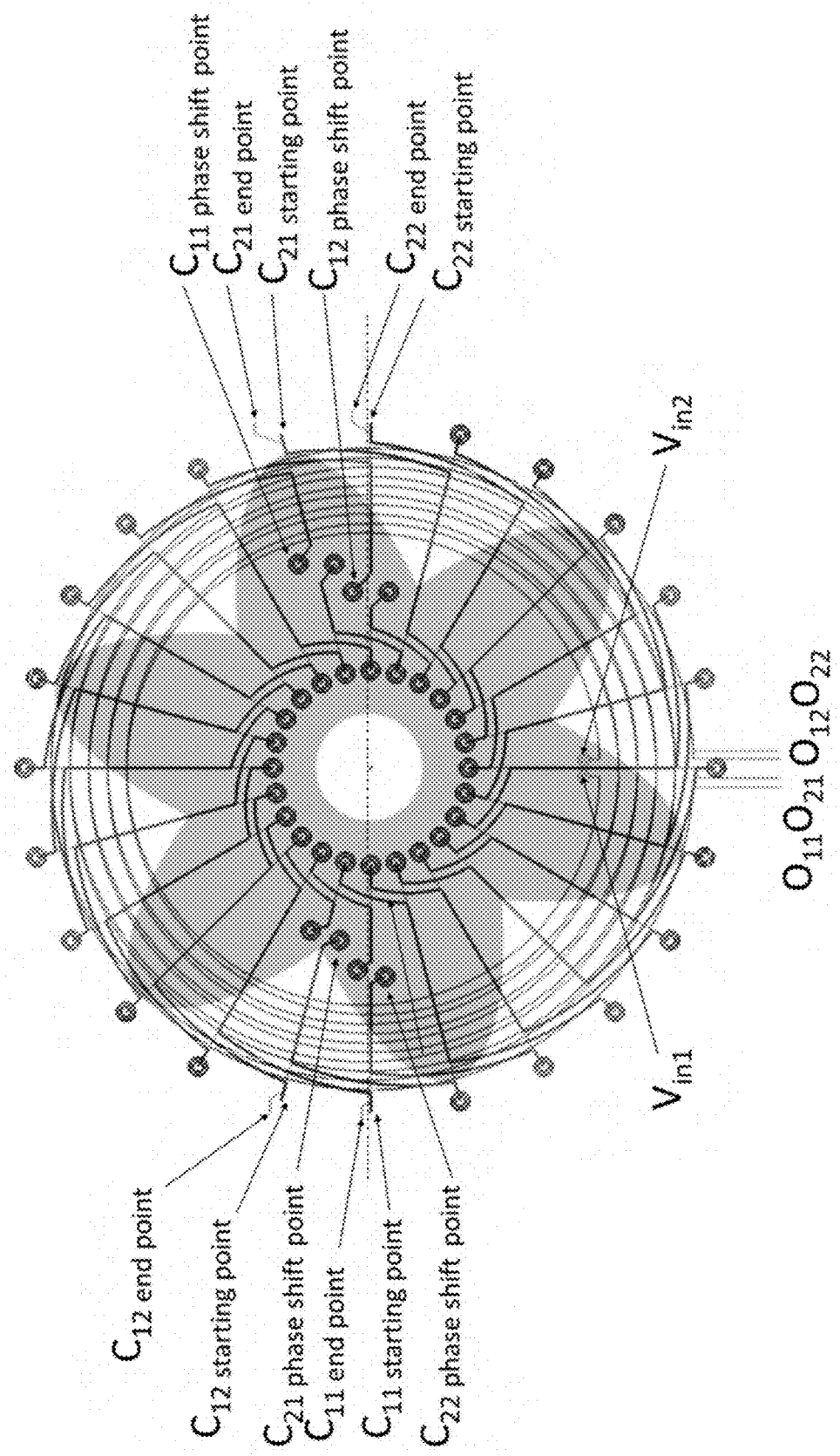
FIG. 6D illustrates a target placed at a 270 degree position, according to certain embodiments of the present invention.

FIG. 6D illustrates a target placed at a 270 degree position, according to certain embodiments of the present invention. In this case, the amount of voltage induced in coil $C_{11}$, $C_{21}$ is shown in FIG. 7A at point $a_4$, $b_4$. The amount of voltage induced in coil $C_{12}$, $C_{22}$ is shown in FIG. 7B at point $c_4$, $d_4$.

The electrical cycle ends at points $a_5$, $b_5$, $c_5$, $d_5$ and the next cycle continues, which would be at 360 degrees, which is equivalent to the 0 degrees case mentioned above. Once the target completes total 360° rotation, three electrical cycles can be observed at the output as shown in FIGS. 7A and 7B.

Various embodiments of the present invention. For example, an apparatus can include a first planar inductive sensor including two oscillator coils and two sensing coils. The apparatus can also include a second planar inductive sensor independent of the first sensor and also including two oscillator coils and two sensing coils. The apparatus can further include a high frequency alternating current carrier generator configured to inject high frequency alternating current carrier signals into the oscillator coils. A carrier signal for the oscillator coil of the first planar inductive sensor can be 180 degrees out of phase with a carrier signal for the oscillator coil of the same planar inductive sensor. Moreover, the oscillator coil of the first planar inductive sensor can be wound in an opposite geometric direction from the oscillator coil of the same planar inductive sensor. The two sensing coils of the first planar inductive sensor can be 90 degrees out of phase with one another. Additionally, the two sensing coils of the second planar inductive sensor are 90 degrees out of phase with one another.

Each of the sense coils can complete three cycles to reach phase shift points and return to starting point. The two oscillator coils can be sourced from independent power supplies. Eddy currents in a conductive target can cause differences in sense coil voltages. The first planar inductive sensor can be configured to be redundant of the second planar inductive sensor. The first planar inductive sensor and the second planar inductive sensor can be configured such that a single sensor fault that disables one of the sensors will not affect the other sensor.

A target can be provided axially facing the printed circuit board including the oscillating coils and the sensing coils. The sensing coils can be configured to detect the angular position of the target. The target can be provided on a printed circuit board. The sensing coils can be configured to detect an absolute angular position of the target.

Figure 8:
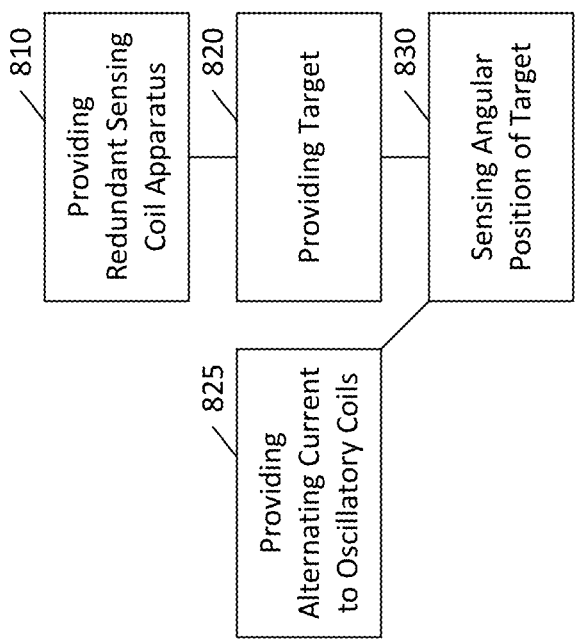
FIG. 8 illustrates a method according to certain embodiments of the present invention.

FIG. 8 illustrates a method according to certain embodiments of the present invention. The method can include providing, at 810, an apparatus such as described above, having a first planar inductive sensor that includes two oscillator coils and two sensing coils, and also having a second planar inductive sensor independent of the first sensor and also including two oscillator coils and two sensing coils. The apparatus can also have any of the other characteristics described above, such as being constructed on a single four-layer PCB. The method can further include, at 820, providing a target electromagnetically linked to each of the sensing coils. The method can further include, at 830, sensing an angular position of the target based on voltages induced in the sensing coils. The sensed position may be an absolute position. The method can further include, at 825, providing alternating current as input to the oscillator coils.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. An apparatus, comprising:
   a first planar inductive sensor comprising two oscillator coils, which are 180 degrees out of phase with respect to each other, and two sensing coils;
   a second planar inductive sensor independent of the first sensor comprising two oscillator coils, which are 180 degrees out of phase with respect to each other, and two sensing coils; and
   a high frequency alternating current carrier generator configured to inject high frequency alternating current carrier signals into the oscillator coils,
   wherein a carrier signal for the oscillator coils of the first planar inductive sensor are in phase with a carrier signal for the oscillator coils of the second planar inductive sensor,
   wherein the oscillator coils of the first planar inductive sensor are wound in a same geometric direction as respective oscillator coils of the second planar inductive sensor,
   wherein the two sensing coils of the first planar inductive sensor are 90 degrees out of phase with one another, and
   wherein the two sensing coils of the second planar inductive sensor are 90 degrees out of phase with one another.

2. The apparatus of claim 1, wherein each of the sensing coils completes three cycles to reach phase shift points and return to starting point.

3. The apparatus of claim 1, wherein the two oscillator coils of the first planar inductive sensor and the two oscillator coils of the second planar inductive sensor are sourced from independent power supplies.

4. The apparatus of claim 1, wherein the two oscillator coils of the first planar inductive sensor are 180 degrees out of phase with one another, and the respective two oscillator coils of the second planar inductive sensor are correspondingly 180 degrees out of phase with one another.

5. The apparatus of claim 1, wherein the first planar inductive sensor is configured to be independently redundant of the second planar inductive sensor.

6. The apparatus of claim 1, wherein the first planar inductive sensor and the second planar inductive sensor are configured such that a single sensor fault that disables one of the sensors will not affect the operation of the other sensor.

7. The apparatus of claim 1, wherein a target is provided axially facing the printed circuit board that comprises the oscillator coils and the sensing coils, wherein the sensing coils are configured to detect the angular position of the target.

8. The apparatus of claim 7, wherein the sensing coils are configured to detect the absolute angular position of the target.

9. The apparatus of claim 1, wherein the oscillator coils and the sensing coils of the first planar inductive sensor and the second planar inductive sensor are provided on a multiple layer printed circuit board and occupy half of a radial area of a printed circuit board.

10. The apparatus of claim 9, wherein the sensing coils occupy first or last two layers of the multiple layer printed circuit board.

11. The apparatus of claim 1, wherein the oscillator coils are on two layers of a multiple layer printed circuit board, and the sensing coils are on two other layers, one respectively set over the other.

12. A method, comprising:
    providing an apparatus having a first planar inductive sensor that includes two oscillator coils and two sensing coils, and also having a second planar inductive sensor independent of the first sensor and also including two oscillator coils and two sensing coils;
    providing 180 degrees out of phase alternating currents as an input to each of the two oscillator coils of the first planar inductive sensor and each of the two oscillator coils of the second planar inductive sensor;
    providing a target electromagnetically linked to each of the sensing coils; and
    sensing an angular position of the target based on voltages induced in the sensing coils.

13. The method of claim 12, wherein the sensed angular position is an absolute position.

* * * * *